United States Patent [19]

McCoy et al.

[11] Patent Number: 5,209,112

[45] Date of Patent: May 11, 1993

[54] EXPENDABLE OCEANOGRAPHIC SENSOR APPARATUS

[75] Inventors: Kim O. McCoy, Carmel, Calif.; John P. Downing, Jr., Port Townsand, Wash.; Bradley G. DeRoos, Worthington, Ohio; Michael R. Riches, Silver Spring, Md.

[73] Assignee: Battelle Memorial Institute, Richland, Wash. ; a part interest

[21] Appl. No.: 662,064

[22] Filed: Feb. 28, 1991

[51] Int. Cl.$^5$ ............................................. G01W 1/00
[52] U.S. Cl. .................................. 73/170.01
[58] Field of Search ...................... 73/170 A

[56] References Cited

U.S. PATENT DOCUMENTS

| | | |
|---|---|---|
| 3,074,671 | 1/1963 | Dinolfo et al. . |
| 3,085,263 | 4/1963 | Yurkinas et al. . |
| 3,267,419 | 8/1966 | Silverstein ................ 73/170 A |
| 3,314,088 | 4/1967 | Nordhaus et al. . |
| 3,372,585 | 3/1968 | Niskin ...................... 73/170 A |
| 3,436,775 | 4/1969 | Schlosser et al. . |
| 3,581,352 | 6/1971 | Lavin . |
| 3,834,229 | 9/1974 | White, Jr. ................ 73/170 A |
| 3,894,648 | 7/1975 | Croullebois . |
| 4,044,611 | 8/1977 | Kaname et al. .......... 73/170 A |
| 4,075,725 | 2/1978 | Mar et al. . |
| 4,186,374 | 1/1980 | Ouellette . |
| 4,258,568 | 3/1981 | Boetes et al. ............ 73/170 A |
| 4,631,956 | 12/1986 | Walden et al. . |
| 4,653,508 | 3/1987 | Cosman . |
| 4,660,568 | 4/1987 | Cosman . |
| 4,673,363 | 6/1987 | Hudson et al. . |
| 4,676,664 | 6/1987 | Anderson et al. . |
| 4,924,698 | 5/1990 | Echert et al. . |
| 4,953,986 | 9/1990 | Olson et al. . |

Primary Examiner—Michael Razavi
Assistant Examiner—Elizabeth L. Shopbell
Attorney, Agent, or Firm—Stephen R. May

[57] ABSTRACT

An expendable oceanographic sensor apparatus is deployed from an airplane or a ship to make oceanographic observations in a profile of the surface-to-ocean floor, while deployed on the floor, and then a second profile when returning to the ocean surface. The device then records surface conditions until on-board batteries fail. All data collected is stored and then transmitted from the surface to either a satellite or other receiving station. The apparatus is provided with an anchor that causes descent to the ocean floor and then permits ascent when the anchor is released. Anchor release is predetermined by the occurrence of a pre-programmed event.

24 Claims, 4 Drawing Sheets

EXPENDABLE OCEANOGRAPHIC SENSOR APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of oceanographic sensors, and more particularly to expendable oceanographic sensors. Sensors of this type are typically deployed in a large body of water, such as an ocean, and remain there for a substantial period of time taking measurements of predetermined water characteristics. For example, such sensors may be deployed from an airplane (by parachute) or from a surface vessel, and may remain in the water for periods of as much as two years, or more.

There are numerous indicia of water phenomena which are of value either to oceanographers in general, or to the captain and crew of surface or subsurface vessels. For example, water temperature, depth, conductivity, optical properties, nutrient availability, etc., may provide valuable information for a number of divergent uses. This information may be used to expand the knowledge base of ocean parameters in general, or may be useful in navigation, sonar communication and the like.

There are numerous apparatus, available to measure various ocean parameters. For example, U.S. Pat. No. 4,953,986, Olson et al., discloses a device to detect air and water surface temperatures beyond the thermal influence of a ship underway at sea. The device accounts for the surface evaporation duct at the air/water interface, which can cause refraction of electromagnetic radiation propagated through it, thereby adversely affecting radio communication, radar and radio navigation transmissions. The device comprises a temperature transducer formed as bifilar wire looped several times around an electrically nonconductive open frame. The resistance of the wire corresponds to ambient temperature. A signal processing network detects the resistance of the wire and provides an electrical pulse modulated output functionally related to the resistance.

Another device is disclosed in U.S. Pat. No. 4,924,698, wherein remote monitoring of oceanographic conditions is accomplished through the use of remote buoys or sensors. Water temperature, salinity and pressure are measured and transmitted to a remote location. The device is affixed to pack ice in the arctic or antarctic, with a sensor package affixed to a cable extending downwardly a fixed distance. The sensor package is provided with a wing, permitting it to move up and down the cable. The depth of the sensor package may be varied at will by adjusting the pitch of the wing relative to the ocean current.

Still another expendable oceanographic probe is disclosed in U.S. Pat. No. 4,044,611, Kaname et al., for recording water temperature, salinity, etc. The device is deployed from a ship and upon sensing various parameters, sends acoustic waves with such information back to the ship. The probe is designed to produce a stable rate of fall through the water, and to control the directional pattern of the sound wave generated into the surrounding water.

Finally, while not an oceanographic sensor, U.S. Pat. No. 4,631,956, Walden et al., discloses an airplane deployed oceanographic mooring device. The device comprises a detachable parachute, a surface float, a subsurface buoy, an anchor shell and a bottom finder.

While the devices described above all work well for their intended purpose, they fail to address the problem solved by the present invention. While it may be of interest to know certain water characteristics at any one instant in time, for a particular depth in the ocean, it is of far greater interest, and value, to have a profile through the ocean, from water surface to ocean floor of the relevant water characteristics. In addition to the top-to-bottom profiles, long-term measurements of conditions on the ocean floor and ocean surface are of interest. An expendable, remote sensor package capable of doing both would find immediate application in both civilian and military applications.

Therefore, a need exists for a simple and inexpensive device which can be deployed from either a ship or an airplane, and which is capable of making and storing measurements of water characteristics. Such device should be capable of making surface-to-floor and floor-to-surface profile measurements, as well as long-term measurements on the ocean floor and surface. Finally, the device should have transmitting capabilities to uplink the data to a satellite orbiting overhead.

SUMMARY OF THE INVENTION

The present invention overcomes the shortcomings of the prior art by providing an inexpensive expendable oceanographic sensor package apparatus which can make and record a number of different measurements of water characteristics while on the surface of the ocean, while on the floor of the ocean, and while descending to and ascending from the floor of the ocean. The apparatus comprises a shipping/deployment member which opens, as, for instance, in clamshell fashion, with the sensor package therein. The sensor package is adapted to measure preselected water characteristics, such as conductivity, temperature and depth, while the sensor package is descending to the ocean floor, while the package is stationary on the ocean floor, while the package ascends to the surface, and while the package floats on the ocean surface.

A detachable anchor or other buoyancy regulating means provided within the shipping/deployment member provides negative buoyancy to the sensor package and maintains the sensor package on the ocean floor until a predetermined event occurs, such as passage of time to a predetermined day, change of a certain hydrographic condition, passage of a predetermined amount of time since deployment, change in pressure or tilt of the sensor package, etc. When such event occurs, release means are activated which causes release of the anchor, and the sensor package ascends to the surface. Control means, such as a microprocessor, are provided to control the acquisition and storage of data, actuation of the release means, as well as other automated functions.

A transmitter is provided to uplink the stored data to a satellite for retransmission to a home base. Some sort of power means, such as long life lithium-cadmium batteries, are provided to electrically power the apparatus.

The device is provided with insulating material between the sensor package and the shipping/deployment member to cushion the impact of the apparatus when it is deployed from an airplane, and to protect the sensor package during shipping and storage.

DETAILED DESCRIPTION OF THE PREFERRED EMBODIMENT

Figure 1A:
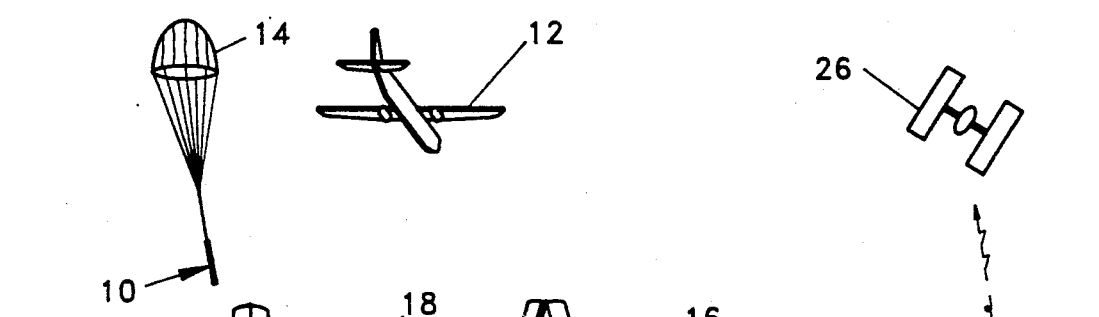
FIG. 1a-e is a sequential representation of the deployment and operation of the present invention.
Figure 1E:
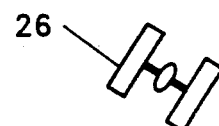
Figure 1B:
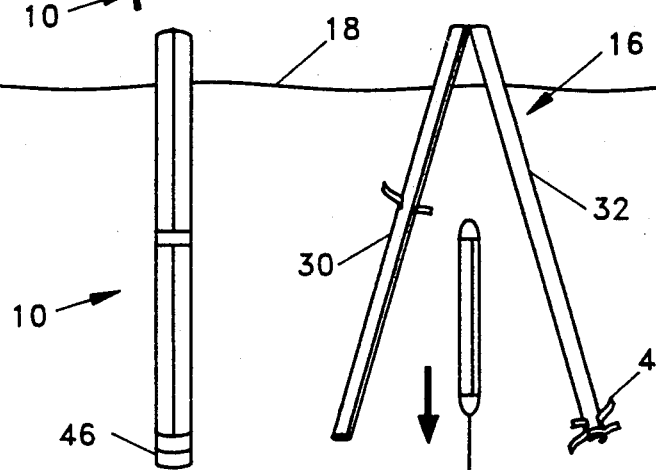

Referring now to FIG. 1, there is shown a schematic representation of the operation of the apparatus of the present invention in its broadest embodiment. In this figure, the apparatus 10 is deployed (FIG. 1a) from an aircraft 12 with a parachute 14 to reduce the rate of fall. The device 10 generally comprising a shipping/deployment member 16, has sufficient buoyancy to float (FIG. 1b) on the surface 18 of the body of water. Soon after deployment into the water, the shipping/deployment member 16 "opens" (FIG. 1c) and the sensor package 20 is released therefrom. The sensor package 20 is provided with an anchor 22 attached by anchor line 24 which causes the sensor package to sink at a predetermined rate and which maintains the sensor package on the floor of the body of water for a period of time. Upon the occurrence of a predetermined event, the anchor 22 is released (FIG. 1d) from the sensor package, which then floats to the surface 18 of the water. The sensor package 20 remains in a substantially vertical attitude at all times after deployment, and descends and ascends at a predetermined rate. The data acquired while the sensor package descends (FIG. 1c), ascends (FIG. 1d) or remains on the bottom or surface of the ocean is transmited to a satellite 26 (FIG. 1e) or other receiving station. The various components of the invention will be explained in greater detail in the sequence they were described above.

Initially, it should be appreciated that the anchor disclosed herein is merely a preferred embodiment, and that any means providing buoyancy regulation may be utilized. For example, the sensor package 20 may be provided with negative buoyancy, and therefore sink to the bottom upon deployment. An inflated balloon (inflated from on-board compressed gasses) may then provide the positive buoyancy necessary to ascend and float on the surface.

The parachute 14 drag system retards the fall velocity of the device so as to limit the impact loading when it strikes the water. The parachute 14 is stored inside the shipping/deployment member 16, explained in greater detail below. Any conventional parachute design can be used, subject only to the space constraints imposed by storage within the shipping/deployment member. Of course, when the apparatus is deployed from a ship rather than from an airplane, the parachute 14 will not be necessary, and the apparatus may be deployed directly into the body of water.

Figure 2:
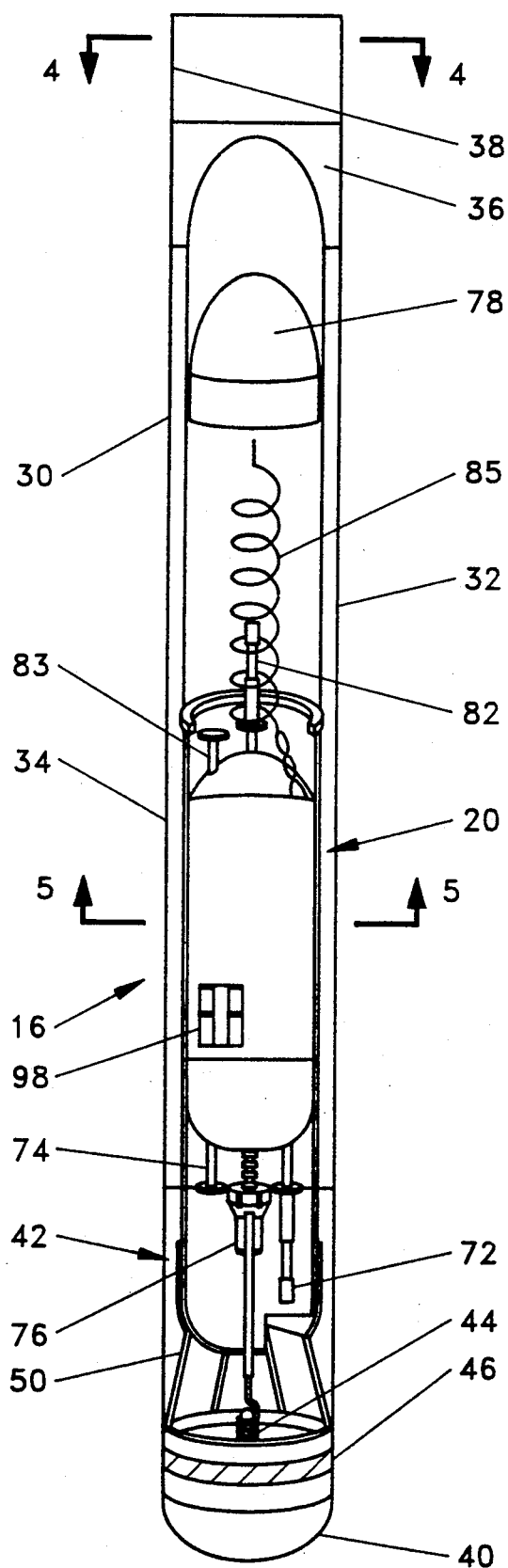
FIG. 2 is a longitudinal sectional view of the apparatus of the present invention.

As illustrated in FIG. 2, the shipping/deployment member 16 is divided into a pair of mated halves 30, 32, which enclose the sensor package 20 therein. The halves 30,32 are preferably separated along a longitudinal axis of the apparatus, and hinged at one end. The annular space between the sensor package 20 and the shipping/deployment member 16 is filled with a shock-absorbing material 34, as is one end 36 of the shipping/deployment member. The parachute 14 is retained within a cavity 38 at one end of the shipping/deployment member 16. At an opposite end of the shipping/deployment member is the anchor 40. The anchor 40 is affixed to the sensor package with an anchor line 44.

Figure 1C:
Figure 1D:
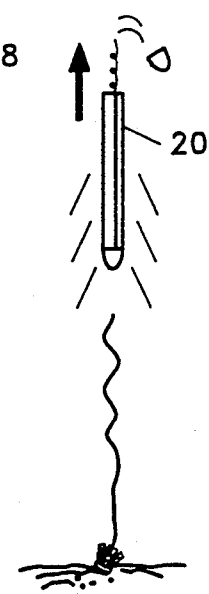

The sensor package 20 is deployed from the shipping/deployment member 16 as illustrated in FIG. 1c. The two halves 30,32 of the shipping/deployment member 16 are releasably retained in a "closed" configuration with means which release upon contact with water. For example, water soluble tape 46 can be secured around the anchor end of the apparatus, so that when sufficiently wetted, it fails (at 48), permitting the two halves 30,32 of the shipping/deployment member to separate from one another. The halves 30,32 may be forced apart by an anchor spring member 50. The anchor spring 50 is "loaded" into the position of FIG. 2 and retained with, e.g., water soluble tape 46. When the tape 46 fails, either the force of the spring 50 (if present) or the weight of the anchor 40 causes the two halves 30,32 of the shipping/deployment member to separate from one another.

Figure 3:
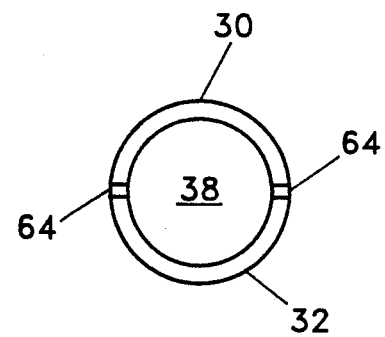
FIG. 3 is a cross-sectional view taken along lines 4—4 of FIG. 2.

When the halves of the shipping/deployment member are separated from one another at the anchor end, the anchor 40 falls free, causing the anchor line 44 to be uncoiled. The anchor line 44 may preferably be about 10 feet in length. A preferred embodiment of an anchor 40 is illustrated in FIG. 1c. The weight may be on the order of 10 pounds. As illustrated in FIG. 3, the shipping/deployment member may be provided with a "live" hinge 64, permitting the halves 30,32 to separate in a "clamshell" arrangement. It is to be understood that any inexpensive and failure-proof hinge mechanism may be utilized.

Figure 4:
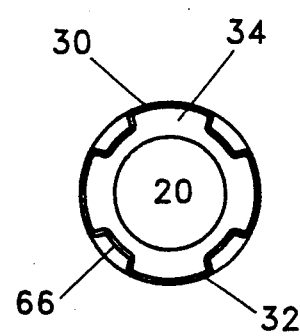
FIG. 4 is a cross-sectional view taken along lines 5—5 of FIG. 2.

FIG. 4 illustrates a cross-sectional view of the apparatus of FIG. 2. While not required, the shipping/deployment member 16 may be constructed with the halves 30,32 provided with ribs 66 for added structural strength and support.

Figure 5:
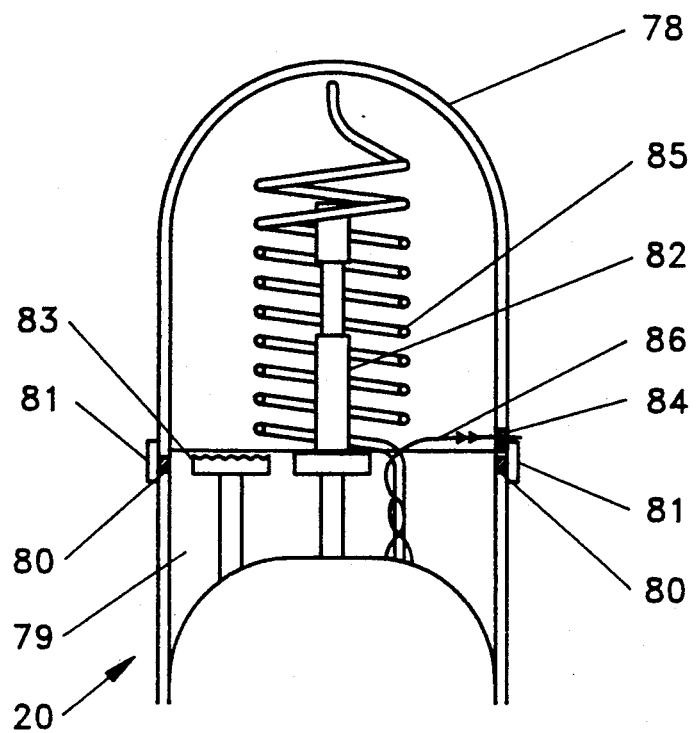
FIG. 5 is partial sectional view of the lower end cap of FIG. 2.

Each end of the sensor package may be provided with end caps and protective fairings. For example, as illustrated in FIG. 5, lower end cap 42 is provided with sensors encased in fairing 52. The fairing 52 is provided with water inlet ports 68 to admit sea water 69 to the interior 70 of fairing 52, thereby allowing water to flow through and out of the fairing 52. A temperature and/or conductivity sensor 72 and a pressure transducer 74 transmit data to the sensor package (described below). Optional sensors, such as an oxygen or optical sensor 76 can be included herein.

Figure 6:
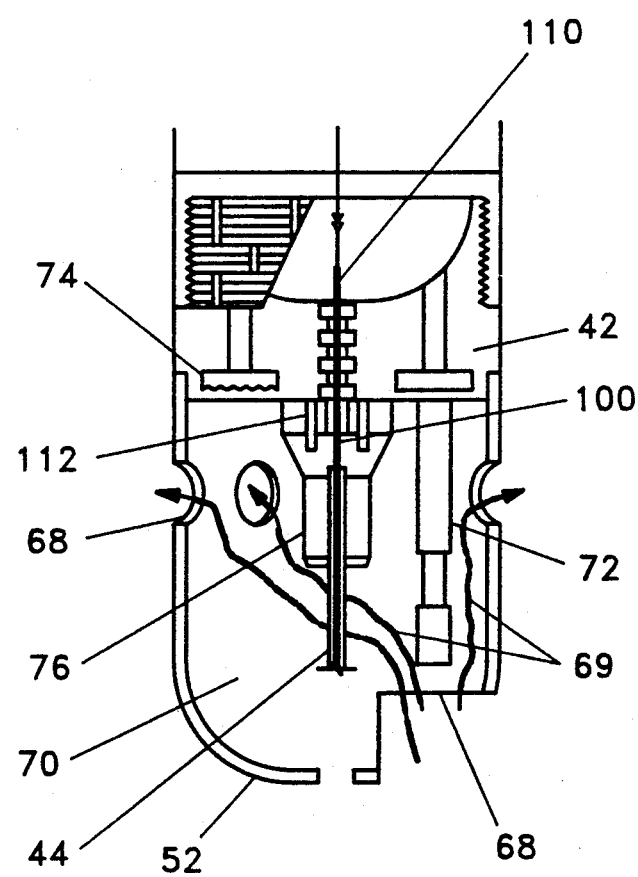
FIG. 6 is a partial sectional view of the upper end cap of FIG. 2.

The upper end of the sensor package is provided with a fairing 78 affixed to the upper end cap 79 (FIG. 6). As in the lower end, the end cap 79 may be advantageously made from machined titanium or other corrosion-resistant material, while the fairings may be constructed of plastic or ceramic materials. The fairing 78 is affixed to end cap 79 at seal member 80. A releasable clip means 81 maintains the seal between fairing 78 and end cap 79. Sensors, such as temperature/conductivity sensor 82 and pressure sensor 83 are provided in the end cap 79 within the interior of fairing 78. When manufactured, the interior of fairing 78 is filled with an inert fluid with a small compressible void space, such as for instance, distilled deionized water, through a plug 84, which is inserted after the fairing is filled. A coiled, spring-like antenna 85 is affixed to the end cap 79 within fairing 78. An electrically conductive wire 86 is interconnected to the on-board power source (below) and terminates within plug 84. The wire 86 is soluble and is adapted to dissolve when sufficient voltage is applied thereto. Alternatively, the entire plug 84 may be constructed so as to dissolve when voltage is applied thereto through the wire 86.

Figure 7:
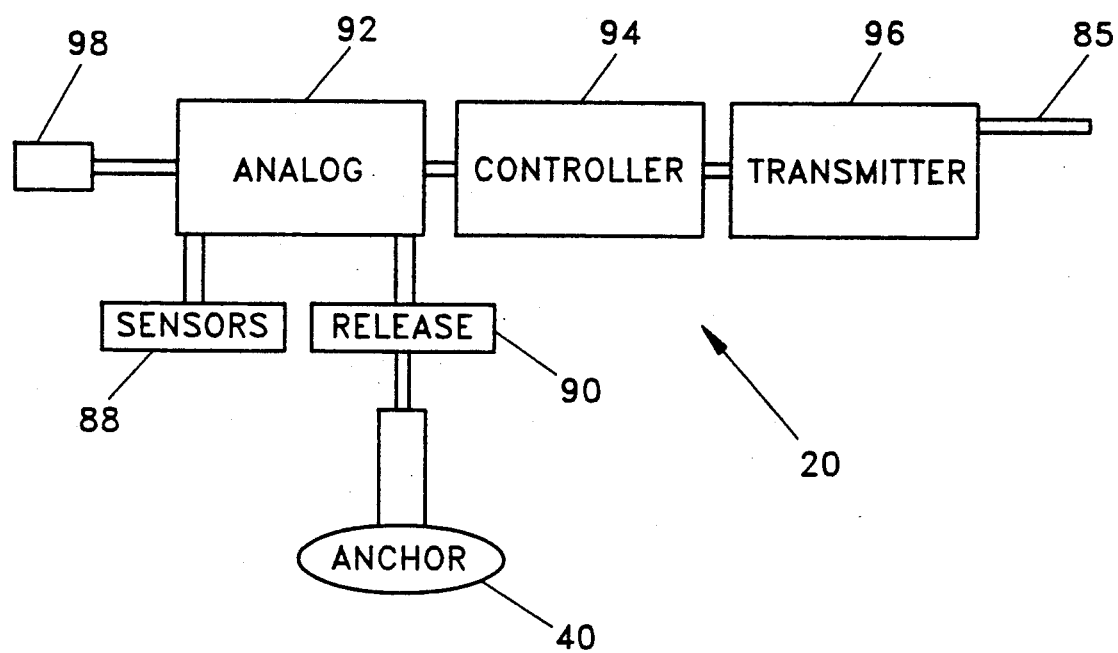
FIG. 7 is a schematic representation of the electronic package of the present invention.

It should be appreciated by those skilled in this art that the particular sensor package, and the individual sensors, are not the point of novelty herein. Rather, there are numerous commercially available sensors on the market which may be used herein, and this invention is limited to neither the sensor itself or its control mechanism. With that in mind, FIG. 7 illustrates schematically the electronics of a representative sensor package of this invention. The various sensors 88 and the anchor release mechanism 90 (described more fully below) are interconnected to the analog section 92 of the electronic package. The analog section 92 is in turn interconnected to the controller 94, which in a preferred embodiment is a microprocessor. The controller 94 controls sampling by the sensors, computes variables, and stores the data in memory for eventual transmission. Lastly, the controller 94 actuates the transmitter 96 to send the stored data via antenna 85 to a satellite or other receiving station. An on board power source, such as lithium batteries 98, powers the controller 94 and associated electronics, and provides electricity to wire 86 inside fairing 78.

After a period of deployment on the floor of the ocean, the anchor 22 is released, and the sensor package floats to the surface of the water. While any number of release mechanisms may be utilized to effect release of the anchor (such mechanisms include explosive cutters, electromagnetic solenoid, hydrostatically activated detent, etc.), applicants have found a particularly effective mechanism to comprise an anchor line having accelerated corrosion when an electric potential is applied to the anchor line. For example, as illustrated in FIG. 5, a small portion 100 of anchor line 44 is exposed to the sea water within lower fairing 52. When an electric potential from batteries 98 is applied to an interior portion of anchor line 110, the electric current flows from exposed portion 100 to grounding electrode 112, completing the circuit. The anchor wire 100 is made from any metal which is subject to accelerated corrosion under such conditions. It is anticipated that under most conditions, failure of the anchor line 100 will occur within about 5 minutes from the onset of continuous electric current being applied thereto.

Just prior to release of the anchor, the upper fairing 78 is ejected from the sensor package, thereby exposing the upper set of sensors 82,83 to ambient seawater conditions. Prior to this time, only the lower set of sensors (FIG. 5) have been activated by exposure to seawater. It is believed advantageous to hold one set of sensors "in reserve" until deployment to the surface, since exposure to seawater tends to have a deleterious, corrosive effect on such sensitive instruments. Therefore, at the time the anchor is released, electric current is also applied to the wire 86, causing it to dissolve. The removal of the wire 86 from plug 84 results in a pinhole in plug 84 (or, alternatively, dissolution of the plug itself), admitting seawater (under pressure) inside fairing 78. The equalization of pressure within fairing 78, in combination with the loaded spring antenna 85, ejects the fairing 78 from sensor package 16. While a number of mechanisms may be utilized, applicants have found that the clip 81 (applied when the apparatus is assembled to maintain pressure on seal 80 so that fluid is retained within fairing 78) may passively be removed by the compression of fairing 78 (due to the hydrostatic pressure of seawater at great depths) against seal 80, thereby allowing fairing 78 to subsequently be removed by the inrush of seawater through plug 84 and the uncoiling of spring antenna 85.

During ascent, both the upper (FIG. 5) and lower (FIG. 6) sensor arrays will monitor water characteristics. Likewise, while floating on the surface, both sensor arrays will collect and transmit data.

Applicants have identified a number of preset conditions which can be programmed into the controller to trigger anchor line failure. By way of example only, such conditions may be: (a) lapse of a predetermined period of time from deployment of the apparatus, (b) change in one or more predetermined hydrographic conditions (such as temperature, conductivity, pressure, etc.), (c) time passage to a particular date irrespective of date of deployment or (d) transient fluctuation in pressure or tilt of the shipping/deployment member. Events such as those in (b) and (d) above may indicate significant environmental changes to which the apparatus should not be subjected.

Once the apparatus reaches the water surface, transmission of stored data can begin, either to a satellite or to other receiving units or stations.

The controller can be programmed to initiate sensors at intervals during descent and ascent. These intervals can be activated by time interval sequence or by any other measurable variable, such as pressure (depth). The controller can likewise be programmed to activate the sensors on timed intervals while on the ocean floor or while on the surface, until failure of the batteries.

The apparatus of the invention may be better understood with reference to the following example.

EXAMPLE

An expendable oceanographic sensor was constructed and deployed during tests at the Marine Sciences Laboratory of Battelle Pacific Northwest Laboratories in Sequim, Wash. An apparatus constructed in accordance with the figures herein (and especially FIG. 2) resulted in the following data:

| | |
|---|---|
| height of drop into water | 15 feet |
| shock load (horizontal orientation) | >50 G. |
| shock load (vertical orientation) | 5-25 G. |
| water descent rate | 5.5 ft/sec |
| water ascent rate | 4.6 ft/sec |
| Anchor - mushroom type, | 10 lbs |
| shipping/deployment member | 5' length, 5" i.d. |
| weight | 28 lbs |

Electronics Specifications

Response

-continued

| Sensor | Range | Accuracy | Time |
|---|---|---|---|
| Pressure | 0–6000 dBar | 0.5% | 10 ms |
| Conductivity | 10–70 mS/cm | 0.02 mS/cm | 20 ms |
| Temperature | −2 to 30° C. | 0.02° C. | 20 ms |
| service depth (est) | 6000 m | | |
| max. deployment (est) | 24 mo. | | |
| data capacity | 6000 scans of CTD | | |
| current demand | standby - 200 μA | | |
| | transmit - 60 mA(ave) | | |
| | CTD on - 70 mA | | |
| memory RAM | 128K Std | | |
| | 1 megabyte optional | | |

While a preferred embodiment has been described herein, it should be appreciated that various changes in details, materials, steps and arrangement of parts can be made without departing from the invention disclosed herein. Those skilled in the art should determine the scope of this invention only with reference to the appended claims.

We claim:

1. Apparatus for remote monitoring of water characteristics in a body of water, comprising:
   (a) a shipping/deployment member having a longitudinal axis, said shipping/deployment member divided into halves along the longitudinal axis with the halves interconnected in clamshell arrangement;
   (b) a sensor package within the shipping/deployment member having sensors for measuring predetermined water characteristics, said sensors being operable to measure water characteristics
      (i) during descent of the sensor package to the floor of the body of water,
      (ii) while anchored to the floor of the body of water,
      (iii) during ascent of the sensor package to the surface of the body of water, and
      (iv) while floating on the surface of the body of water;
   (c) a detachable anchor within the sensor package so as to provide negative buoyancy to the sensor package while therein; and
   (d) a transmitter for transmitting sensor data to a satellite.

2. The apparatus as recited in claim 1, wherein the sensor package comprises sensors to measure water temperature, water conductivity and water depth.

3. The apparatus as recited in claim 1, wherein the shipping/deployment member comprises a cylindrical structure having positive buoyancy when the detachable anchor is attached.

4. The apparatus as recited in claim 1, wherein the shipping/deployment member is provided with a parachute for deployment from an aircraft into the body of water.

5. The apparatus as recited in claim 1, wherein the anchor is provided with release means comprising an anchor line subject to accelerated corrosion when an electric potential is applied thereto, and means to generate an electric potential across the anchor line.

6. The apparatus as recited in claim 5, wherein the apparatus comprises control means to control the accumulation of data from the sensors and the actuation of said release means.

7. The apparatus as recited in claim 6, wherein the control means is programmed to actuate the release means upon the occurrence of an event selected from the group consisting of (a) lapse of a predetermined time period, (b) change in a predetermined hydrographic condition, (c) time passage to a predetermined date, or (d) transient fluctuation in pressure or tilt of the shipping/deployment member.

8. The apparatus as recited in claim 7, wherein the control means actuates the sensors for the accumulation of data when the sensor package is on the ocean floor, the ocean surface, and for the accumulation of profiles of water characteristics when the sensor package is descending to and ascending from the ocean floor.

9. The apparatus as recited in claim 1, wherein the shipping/deployment member is lined with shock absorbent material to cushion the sensor package against impact of the shipping/deployment member when it enters the body of water.

10. Apparatus for remote monitoring of water characteristics in a body of water, comprising:
    (a) a shipping/deployment member;
    (b) a microprocessor controlled sensor package having sensors to measure predetermined water characteristics during
       (i) descent of the sensor package to the floor of the body of water;
       (ii) a predetermined period of time while the sensor package is on the floor of the body of water;
       (iii) ascent of the sensor package to the surface of the body of water; and
       (iv) while floating on the surface of the body of water;
    (c) a detachable anchor providing negative buoyancy to the sensor package;
    (d) a transmitter for transmitting data from the sensor package to a receiving station.

11. The apparatus as recited in claim 10, wherein the sensor package further comprises data storage means to store the data collected by the sensor package, such that said data can be transmitted by the transmitter to a satellite while the shipping/deployment member is floating the surface of the body of water.

12. A method of measuring a plurality of water profile characteristics in a body of water, comprising the steps of:
    (a) deploying a sensor package having a plurality of sensors therein into a body of water, said sensor package having negative buoyancy when deployed;
    (b) sensing a plurality of water characteristics as said sensor package descends to the floor of the body of water;
    (c) deploying an anchor to maintain the sensor package on the floor of the body of water;
    (d) sensing a plurality of water characteristics while the sensor package is deployed on the floor of the body of water;
    (e) releasing the anchor with release means subject to accelerated corrosion when an electric potential is applied thereto;
    (f) sensing a plurality of water characteristics as the sensor package ascends to the surface of the body of water;
    (g) sensing a plurality of water characteristics as the sensor package floats on the surface of the body of water, and
    (h) transmitting the results of steps (b), (d), (f) and (g) to a receiving unit.

13. The method as recited in claim 12, further comprising deploying the sensor package in a shock-absorbing shipping/deployment member from an aircraft with a parachute.

14. The method as recited in claim 12, further comprising measuring water temperatures, water conductivity and water depth with the plurality of sensors.

15. The method as recited in claim 12, further comprising generating an electric potential across the release means with batteries contained within the sensor package.

16. The method as recited in claim 12, further comprising releasing the anchor upon the occurrence of an event selected from the group consisting of (a) lapse of a predetermined time period, (b) change in a predetermined hydrographic condition, (c) time passage to a predetermined date, or (d) transient fluctuation in pressure or tilt of the shipping/deployment member.

17. The method as recited in claim 12, further comprising storing the data sensed from the plurality of water characteristics in memory means until transmittal to the receiving unit.

18. The method as recited in claim 12, further comprising providing a plurality of different sets of sensors for use while descending, while ascending, while on the floor of the body of water, or while floating on the surface of the body of water.

19. Apparatus for remote monitoring of water characteristics in a body of water, comprising:
  (a) a sensor package having first and second fairings at respective ends thereof each having a plurality of sensors therin to measure predetermined water characteristics during
    (i) descent of the sensor package to the floor of the body of water;
    (ii) a predetermined period of time while the sensor package is on the floor of the body of water;
    (iii) ascent of the sensor package to the surface of the body of water; and
  (b) means for regulating buoyancy of the sensor package; and
  (c) a transmitter for transmitting data from the sensor package.

20. The apparatus as recited in claim 19, wherein the first fairing is filled with an inert fluid protecting the sensors therein contact with the body of water.

21. The apparatus as recited in claim 20, wherein the said first fairing is provided with means to permit introduction of water from the body of water into the interior of the first fairing.

22. The apparatus as recited in claim 21, wherein the means to permit introduction of water comprises an electrically conductive wire through the first fairing which dissolves upon application of current thereto.

23. The apparatus as recited in claim 21, wherein the first fairing is ejected from the sensor package when water is introduced therein.

24. The apparatus as recited in claim 21, wherein the apparatus further comprises a coiled antenna which assists the ejection of the first fairing from the sensor package.

* * * * *